Jan. 6, 1959 W. F. SKILLIN ET AL 2,867,442
POWER CHUCK
Filed Dec. 10, 1956
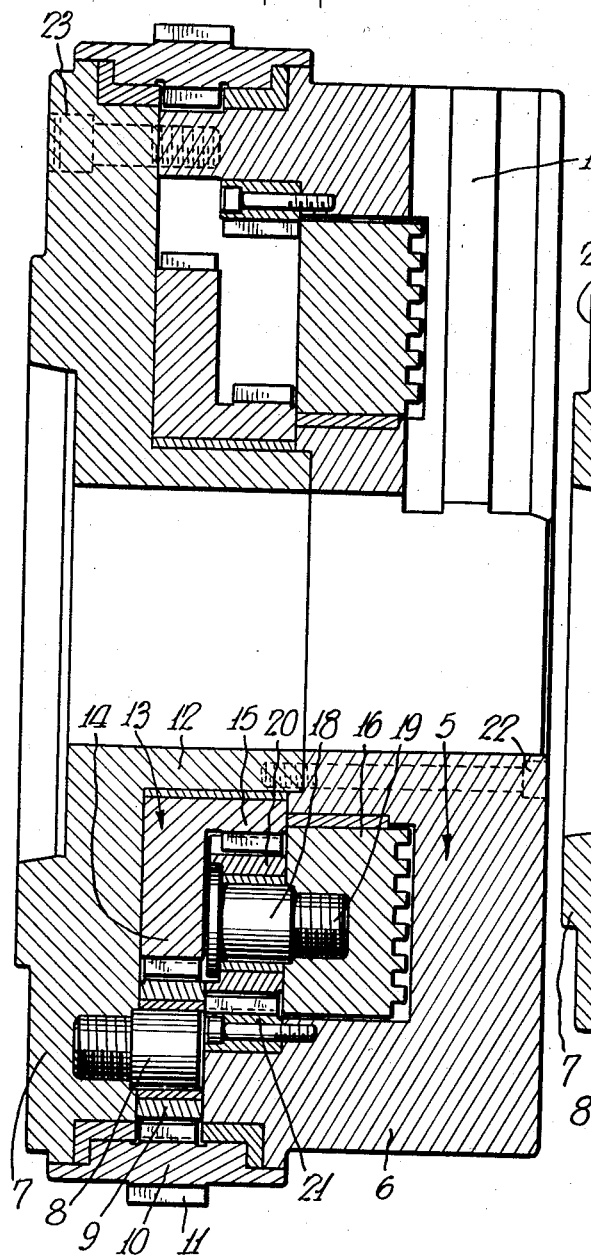
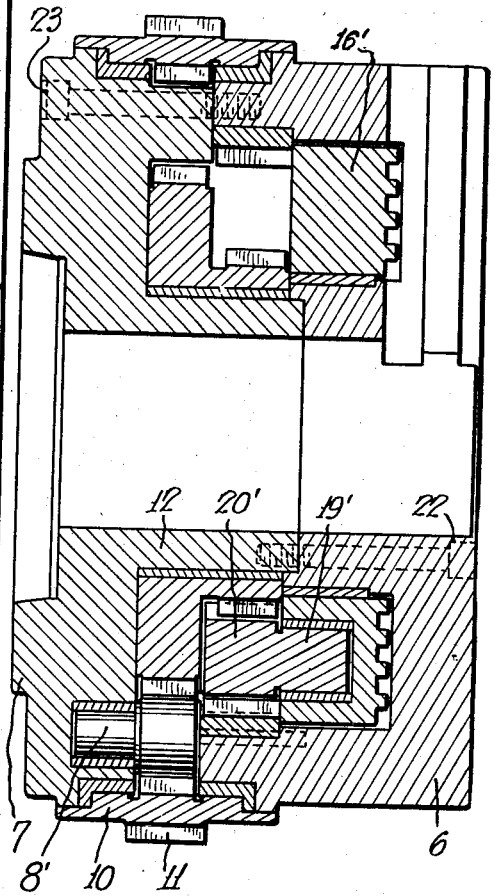
INVENTORS
Walter F. Skillin
Alexandra Damijonaitis
BY
ATTORNEYS

United States Patent Office 2,867,442
Patented Jan. 6, 1959

2,867,442

POWER CHUCK

Walter F. Skillin, New Britain, and Alexandra Damijonaitis, Newington, Conn., assignors to Union Manufacturing Company, New Britain, Conn., a corporation of Connecticut Application December 10, 1956, Serial No. 627,326

8 Claims. (Cl. 279—114)

Our invention relates to a chuck, particularly a scroll chuck, although the principles of our invention are not so specifically limited.

It is an object of our invention to provide a chuck of the character indicated, wherein the scroll or other means for driving the jaws is actuated by an improved gear train for providing a proper gear ratio to move the jaws with the requisite force upon the application of a relatively small actuating force.

Another object is to provide a gear train in a chuck body, which will actuate the chuck jaws with great force and yet will be compact and balanced.

Other objects and various features of novelty and invention will be hereinafter pointed out or will become apparent to those skilled in the art.

Briefly stated, in a preferred form of the invention we provide a chuck body having chuck jaws movable thereon and actuated by scroll or other means. The scroll or other means is actuated by compound gearing in the body of the chuck, arranged in compact fashion, and which will provide a heavy clamping action of the jaws upon the application of a light actuating or driving force.

In the drawings which show, for illustrative purposes only, preferred forms of the invention—

Fig. 1 is a central, diametral sectional view through a scroll chuck, illustrating features of the invention;

Fig. 2 is a similar view illustrating a slight modification, better adapted perhaps for the smaller size chucks.

In the drawings are illustrated a scroll chuck having a chuck body 5, including a front body section 6 and a rear body section or back cover 7. Between these two body sections 6—7, a scroll plate and all of the driving mechanism are mounted. In the forms illustrated, we provide a hub gear, including a gear of relatively large diameter and a hub pinion of smaller diameter. The hub gear may be directly or indirectly driven by suitable manual or power means, and the hub pinion is geared to drive the scroll or other jaw actuating mechanism.

Specifically, in Fig. 1 we show a driving pinion including a hub bearing 8, fixedly mounted in the chuck body, specifically in the back plate 7. This bearing hub or stud 8 carries a drive pinion 9, which is rotatable thereon, as will be understood. This assembly is referred to as a drive pinion, whether or not the actual pinion 9 rotates on the bearing hub 8 or whether the latter rotates with the gear 9 in the hub body section 7. It will be understood that normally several drive pinions 9 will be employed about the circumference of the chuck so as to provide a proper centrifugal balance and a balanced actuation of parts hereinafter described.

The drive pinion or pinions 9 may be rotated by an annular gear 10 having teeth meshing with the teeth on the pinions 9. This annular gear 10 is rotatably mounted on the chuck body, specifically between the two sections 6—7, and may be provided with spur gear teeth 11 for engagement by a wrench or other power means for rotating the same relatively to the body.

Within the chuck body is a hub 12, in the form shown forming part of the rear section 7. On this hub is mounted a hub gear 13, which preferably comprises a spur gear 14 of relatively large diameter and a spur pinion 15 of relatively smaller diameter. In the form illustrated, the gears 14—15 are integral with each other.

A scroll plate 16 is rotatably mounted in the chuck body and has scroll teeth meshing with corresponding scroll teeth on a plurality of jaws (not shown), guided in ways as 17. The scroll plate or scroll means in the form shown in Fig. 1 includes a bearing stud or hub 18 having a part 19 fixed in the scroll plate. A scroll pinion 20 is mounted rotatably on the stud 18 and meshes with the teeth on the hub pinion 15. There may be several scroll pinions 20 mounted circumferentially of the chuck body so as to give proper balance to the chuck and provide a proper drive to various parts. These scroll pinions, while rotatably mounted on the scroll plate are carried bodily thereby so that when the scroll pinions are translated bodily, the scroll plate also moves the same way.

The scroll pinions 20 preferably mesh with a fixed annular gear 21 mounted within the chuck body. Thus, when the scroll pinion 20 rotates about its own axis, it crawls bodily about the internal gear 21 and thus through the bearing and stud portions 18—19 the scroll plate is carried around bodily.

It should be noted that the two body sections 6—7 of the chuck body are held together by screws 22 extending in from the front of the chuck and adjacent the center thereof and screws 23 extending in from the rear of the chuck adjacent the outer periphery. The overall operation is as follows:

The ring gear 10 is rotated either by hand or by power means, such as a power wrench (not shown) and when that ring gear is so rotated it rotates the drive pinions 9, which in turn rotate the hub gear 14 and the hub pinion 15. The pinion 15 in turn rotates the scroll pinion 20, which as stated meshes with the fixed internal gear 21, thus carrying the scroll plate with it, and through the actuating teeth or cams on the scroll plate 16 and jaws 17 the latter are moved. It will be seen that an advantageous gear ratio is obtained through the hub gear, including the large gear 14 and the small hub pinion 15, and again by the crawling of the scroll pinion 20 about the fixed annular gear 21 in the chuck body. Thus, a very compact arrangement has been provided and an advantageous gear ratio obtained without undue increase in size of the chuck.

In the form shown in Fig. 2, the parts are substantially as heretofore described, except as to some details. In Fig. 1, it will be recalled that the bearing stud 8 is fixedly carried in the back part of the chuck body, whereas in Fig. 2 the stud part 8' is rotatably mounted in the chuck body and the pinion teeth are integral with the stud portion 8'. Thus, the pinion in Fig. 2 may be made conveniently of smaller diameter than is the case in Fig. 1. Furthermore, in Fig. 2 the scroll pinion 20' is integral with the stud portion 19', which latter rotates in the scroll body, and therefore the scroll pinion in Fig. 2 may be made smaller in general than the scroll pinion of Fig. 1. Thus, in the form shown in Fig. 2, while the parts are of substantially the same construction and operate in the same overall manner as the parts described in Fig. 1, it will be seen that, for the smaller size chucks, the specific form shown in Fig. 2 may be preferable.

While the invention has been described in considerable detail and preferred forms illustrated, it is to be understood that various changes may be made within the scope of the invention as defined in the appended claims.

We claim:

1. In a chuck of the character indicated, a chuck body, chuck jaws movable thereon, scroll means for moving said jaws, a hub gear including a gear and a relatively smaller pinion, means for driving said gear, a scroll pinion carried by said scroll means and rotatable relatively thereto and meshing with said first-mentioned pinion, and stationary gear means meshing with said scroll pinion.

2. In a chuck of the character indicated, a chuck body, jaws movable thereon, scroll means for moving said jaws, a drive pinion mounted about a fixed axis in said body, means for driving said drive pinion, a hub gear including a gear meshing with said drive pinion, and including a hub pinion of lesser diameter, a scroll pinion rotatably mounted about a fixed axis on said scroll means, said scroll pinion meshing with said hub pinion, and a fixed internal gear mounted in said body and meshing with said scroll pinion, whereby driving of said drive pinion will rotate said scroll means for moving said jaws.

3. In a chuck of the character indicated, a chuck body, jaws movably mounted on said body, scroll means carried by said body, a drive pinion mounted about a fixed axis in said body, an internal gear extending about said chuck body and meshing with said drive pinion, a hub gear mounted for rotation about a hub in said chuck body, said hub gear comprising a gear of relatively large diameter meshing with said drive pinion, said hub gear including also a pinion of relatively smaller diameter, a scroll pinion rotatably carried by said scroll means about a fixed axis thereon and meshing with said hub pinion, a fixed internal gear in said chuck body and meshing with said scroll pinion, whereby upon rotation of said gears and pinions said scroll pinion will crawl around bodily on said internal gear and carry said scroll means with it, whereby said scroll means may operate said jaws.

4. In a chuck of the character indicated, a chuck body, chuck jaws mounted on said body, scroll means for moving said jaws, a bearing hub fixedly mounted in said chuck body, a drive pinion rotatably mounted on said hub, means for rotating said drive pinion, a second hub in said chuck body, a hub gear rotatably mounted thereon and comprising a pinion of small diameter and a gear of large diameter meshing with said drive pinion, a bearing stud fixedly mounted in said scroll means, and a scroll pinion rotatably mounted thereon and meshing with said hub pinion, an internal gear fixedly mounted in said chuck body and meshing with said scroll pinion, for the purpose described.

5. In a chuck of the character indicated, a chuck body, chuck jaws movable thereon, scroll means for moving said jaws, a drive pinion having a bearing portion rotatably mounted in said chuck body about a fixed axis, a hub gear rotatably mounted about a hub in said body and comprising a gear of relatively large diameter meshing with said drive pinion, and a pinion of relatively smaller diameter, a scroll pinion having a bearing hub rotatably mounted in said scroll means about a fixed axis thereon, said scroll pinion being in mesh with said hub pinion, and a fixed internal gear in said chuck and meshing with said scroll pinion, whereby upon rotation of said gears and pinions said scroll means will be carried about by said scroll pinion and cause said jaws to move.

6. In a chuck of the character indicated, a chuck body, chuck jaws movable thereon, scroll means for moving said jaws, drive means including a hub gear rotatably mounted about a hub in said body and comprising a gear with radially outwardly facing teeth, a scroll pinion rotatably mounted on a fixed axis on said scroll means and meshing with said hub gear, and a fixed gear in said chuck and having inwardly facing teeth meshing with said scroll pinion, whereby upon rotation of said hub gear said scroll means may be actuated to drive said jaws with relatively great mechanical advantage.

7. In a chuck of the character indicated, a chuck body, chuck jaws movable thereon, scroll means for moving said jaws, a drive pinion having a bearing portion rotatably mounted in said chuck body about a fixed axis, a hub pinion rotatably mounted about a hub in said body and comprising a gear of relatively large diameter meshing with said drive pinion, and a pinion of relatively smaller diameter, a scroll pinion having an integral pivot stud rotatably mounted in a bore in said scroll means and therefore about a fixed axis thereon, said scroll pinion being in mesh with said hub pinion, and a fixed internal gear in said chuck and meshing with said scroll pinion, whereby upon rotation of said gears and pinions said scroll means will be carried about by said scroll pinion and cause said jaws to move.

8. In a chuck of the character indicated, a chuck body, chuck jaws mounted on said body, scroll means for moving said jaws, a drive pinion having an integral pivot stud journaled for rotation in a bore in said chuck body, means for rotating said drive pinion, a hub in said chuck body, a hub gear rotatably mounted thereon and comprising a gear of large diameter meshing with said drive pinion, and a pinion of smaller diameter, a scroll pinion rotatably mounted on a fixed axis in said scroll means and meshing with said hub pinion, and an internal gear fixedly mounted in said chuck body and meshing with said scroll pinion, for the purpose described.

References Cited in the file of this patent

UNITED STATES PATENTS

| | | |
|---|---|---|
| 1,441,803 | Hay | Jan. 9, 1923 |
| 1,807,385 | Church | May 26, 1931 |
| 2,528,442 | Leifer | Oct. 31, 1950 |
| 2,579,796 | Church | Dec. 25, 1951 |